United States Patent
Korpela et al.

(10) Patent No.: US 7,092,715 B2
(45) Date of Patent: Aug. 15, 2006

(54) METHOD AND APPARATUS FOR NODE ADDING DECISION SUPPORT IN A WIRELESS NETWORK

(75) Inventors: Harri Korpela, Espoo (FI); Jukka K. Nurminen, Espoo (FI)

(73) Assignee: Nokia Corporation, Espoo (FI)

( * ) Notice: Subject to any disclaimer, the term of this patent is extended or adjusted under 35 U.S.C. 154(b) by 74 days.

(21) Appl. No.: 10/487,607

(22) PCT Filed: Aug. 22, 2001

(86) PCT No.: PCT/EP01/09718

§ 371 (c)(1),
(2), (4) Date: Feb. 20, 2004

(87) PCT Pub. No.: WO03/019964

PCT Pub. Date: Mar. 6, 2003

(65) Prior Publication Data

US 2004/0248578 A1   Dec. 9, 2004

(51) Int. Cl.
*H04Q 7/20* (2006.01)
(52) U.S. Cl. ..................................... 455/446
(58) Field of Classification Search ................. 455/446
See application file for complete search history.

(56) References Cited

U.S. PATENT DOCUMENTS 5,491,644 A   2/1996   Pickering et al. ....... 364/514 R

FOREIGN PATENT DOCUMENTS

| WO | WO 99/38274 | 7/1999 |
|---|---|---|
| WO | WO 00/74401 A1 | 12/2000 |

OTHER PUBLICATIONS

Nurminen J.K. et al.: "An analog CAD system combining knowledge-based techniques with stimulation and optimization" Proceedings of the Fourth Conference on Artificial Intelligence Applications. San Diego, Mar. 16-18, 1998, Washington, IEEE Comp. Soc. Press, US, vol. Conf. 4, Mar. 14, 1988, pp. 415-417 XP010011930.

*Primary Examiner*—William D. Cumming
(74) *Attorney, Agent, or Firm*—Lackenbach Siegel LLP

(57) ABSTRACT

A method and apparatus determines whether a new node can be added to a wireless network at a specified position. Information concerning existing network nodes that are in the neighborhood of an inputted position of the new node is extracted from a dynamic network management database. The information extracted from the dynamic network management database may include dynamic position data and/or dynamic transmitting/receiving characteristics data of the existing network nodes. The information regarding the existing network nodes neighboring the inputted position of the new network node as extracted from the dynamic network management database is used to calculate a network coverage at the inputted position. Finally, the result of the calculated network coverage at the inputted position is outputted.

10 Claims, 5 Drawing Sheets

METHOD AND APPARATUS FOR NODE ADDING DECISION SUPPORT IN A WIRELESS NETWORK

FIELD OF THE INVENTION

The present invention relates to a method and apparatus for supporting a decision concerning a determination whether a new node, such as a wireless router, can be added to a wireless network.

BACKGROUND OF THE INVENTION

In the last years the Internet has seen a rapid growth so that the Internet has become one of the single most important tools for communication. Along with the growth of the Internet the need for quick and ready access to the Internet from any location has increased. As a result access bandwidth demand has been growing at such a pace that the wired infrastructure can not keep up with. The upgrading of the wired infrastructure to provide high-speed and remote Internet access is costly complicated and time consuming, resulting in a bottleneck at the Internet access point the so-called last mile of Internet infrastructure.

Wireless broadband networks make high performance Internet access possible where wired broadband infrastructure is impractical. However, such a wireless broadband network will only be a success especially for residential and small business markets if the infrastructure is provided at a low-cost, is robust to changing environments and easy to deploy and scalable with market demand.

High-performance wireless connections require clear line-of-sight between links. In many environments or surroundings buildings, trees, hills and the topography make line-of-sight difficult.

New wireless networks with wireless routers as network nodes on a mesh network basis emulate the topology and protocols of the Internet but are optimised for wireless high-speed data transmission. As an example of such a wireless broadband solution a wireless routing network has been developed. The key components of such a wireless routing network are a routed mesh network architecture, wireless routers, a wireless operating system and the deployment and management of the network.

Routed mesh networks mirror the structure of the wired Internet. Each radio transceiver at a node in the wireless network becomes part of the infrastructure and can route data through the wireless mesh network to its destination just as in the wired Internet. The advantage of such a routed mesh networks is that line-of-sight problems can be reduced in comparison to a client/base station architecture because each node only needs line-of-sight to one other node in the network and not all the way to the ultimate destination of the data traffic, e.g. the point-of-presence (POP). With such an infrastructure the reach and coverage of the wireless network is extended with a minimal amount of wireless network infrastructure and interconnection costs. The data traffic can be routed around obstructions rather than needing to deploy additional base stations for line-of-sight in densely populated diverse geographical locations. The more wireless routers are added to the network, the more robust and far-reaching the network becomes. In the above mentioned wireless routing network, wireless router with omni-directional antennas are used as a network node. Each wireless router can communicate with other nodes, i.e. other wireless routers in any direction. The omni-directional antennas offer a 360-degree range and do not require precise pointing or steering. Therefore additional wireless routers can be added in an ad hoc and incremental fashion.

The wireless routers substantially comprise three components, namely a full TCP/IP (Transmission Control Protocol/Internet Protocol) protocol suite support, a wireless operating system that optimises the wireless network performance and robustness, and a high-performance digital RF modem. A specialized wireless networking software in combination with the high-performance RF modem optimise the network performance while insuring full IP support and robust and steamless IP routing.

Routed wireless mesh networks deploy specialized protocols, that operate efficiently in a multihop wireless network environment. From the media access control (MAC) layer through to the routing layer new protocols must be used that are specifically designed to deal with their unique attributes. The protocol suite extends the traditional TCP/IP stack to provide efficient and robust IP-based networking in multihop wireless mesh networks. These protocols consist of four parts, namely channel access protocols, reliable link and neighbour management protocols wireless multihop routing and multicast protocols and standard Internet protocols.

In the channel access, protocols are used to efficiently schedule transmissions to avoid collisions and efficiently reuse the available spectrum. Reliable link and neighbour management protocols ensure reliable transmissions on a hop-by-hop basis, and manage the automatic adaptation to changes in the network topology by monitoring the status of neighbour links. The role of the reliable link and neighbour management protocols is to perform network synchronisation and to manage the links to each neighbour node. Wireless multihop routing and multicast protocols maintain performance-optimised routing tables and enable an efficient multicast capability. The standard Internet protocols and tools for seamless integration with the wired Internet. The protocols and tools are for example TCP/IP, UDP (User Datagram Protocol), SNMP (Simple Network Management Protocol), RIP, ICMP (Internet Control Message Protocol), TFTP, ARP, IGMP, Proxy-ARP, DHCP relay (Dynamic Host Configuration Protocol), DHCP server, NAT (Network Address Translation).

Wireless mesh networks based on a multipoint-to-multipoint architecture make an ad hoc integration of new nodes, i.e. wireless routers, easier, since the actual demand and traffic flow in such a wireless network environment makes it much easier to adjust the coverage and bandwidth needs than design a network ahead of time. Adaptive routed mesh network make obstructions to the line-of-sight acquirements by growing trees of temporary obstructions less problematic, since the data traffic is automatically re-routed through as a link becomes unavailable. The nodes, i.e. wireless routers, in such an wireless routing network environment can adapt to changes in the link availability and the quality in real-time without requiring intervention by a network administrator.

A network operating system continuously monitors the status and quality of the links and makes real-time routing decisions based on the current network status. New nodes can be authenticated and assimilated into the network topology without manual reconfigurations.

Before a new node, i.e. a wireless router, can be added to the wireless network it is an essential question, whether, such a new node at a specific position lies within the coverage of the wireless network.

So far, a static map with predefined coverage areas has been used for the above determination of a network coverage, or alternatively a side survey was carried out.

SUMMARY OF THE INVENTION

It is therefore an object of the present invention to provide an improved method and apparatus for determining whether a specified position of a possible new node lies within the network coverage of a wireless network.

This object is achieved by a method for determining whether a new node can be added to a wireless network at a specified position according to claim 1.

The present invention is based on the recognition that in a wireless network composing a network management system with a dynamic network management database, which regularly updates the current status of the network nodes in said wireless network, a method for determining whether a new node can be added to said wireless network at a specified position uses the following steps. Firstly, a possible position for said new network node is inputted. Information concerning those existing network nodes that are in the neighbourhood of the inputted position is extracted from said dynamic network management database. The information extracted from said dynamic network management database comprise dynamic position data and/or dynamic transmitting/receiving characteristics data of said existing network nodes. The information regarding the existing network nodes neighbouring said inputted position of said new network node as extracted from the dynamic network management database is used to calculate a network coverage at said inputted position. Finally, the result of the calculated network coverage at said inputted position is outputted.

Using such a method for determining whether a new network node lies within a network coverage of a wireless network has the advantage that a more reliable forecast of the network coverage is possible. Furthermore no side survey needs to be carried out at the specific position and the forecast is based on always up-to-date data of the network, since the current status of the network nodes is regularly updated in the dynamic network management database.

According to a further development of the invention, the result of the network coverage calculation is edited such that said result indicates network coverage or no network coverage at said specified position. By editing of the result of the calculation the presence or absence of a network coverage at the specified position is being made unequivocally clear even for layman. The complex, accurate and tailorable decision making function for the network coverage calculation is presented such that the user experience is kept very simple.

According to another further development of the invention, a web user interface is used for inputting the possible position of said new network node and for outputting said result of the calculated network coverage at said inputted position. Thus any user or end-client can carry out a reliable forecast regarding the network coverage at a specific position by simply entering said position into the web user interface. The network coverage is calculated for said specified inputted position and outputted to the user via the web user interface, whereby a straight forward network coverage forecast can be carried out by a end-client as an user self-service.

Preferably, the specified position can be entered by simply inputting a street address and the probable antenna installation height associated to the network node. The feature of forecasting a network coverage at a specified street address and the specified installation height of an associated antenna is very simple and user friendly.

According to still another advantageous development, the entered specified position and the result of the calculated network coverage is stored in a dynamic network coverage database. Such a collection of user street address in combination with the calculated network coverage can be used for future planning of the expansion of a wireless network. The collection can also be used for marketing purposes.

The wireless network nodes may be configured as wireless routers.

In addition thereto, the above object is also achieved by a decision support apparatus for determining whether a new node can be added to a wireless network at a specified position according to claim 7.

The wireless network comprises a network management system with a dynamic network management database which updates the current status of the network nodes in the wireless network on a regular basis. Each network node is fitted for communication with other network nodes. Said decision support means comprises an information extracting means configured to extract information regarding existing network nodes in the neighbourhood of said specified position from said dynamic network management database. The information extracted from said dynamic network management database comprises dynamic position data and/or dynamic transmitting/receiving characteristics data of existing network nodes in the neighbourhood of said specified position. Based on these information a calculating means calculates a network coverage at said inputted position. Said decision support means further comprises input/output interface means configured to enable communication with the wireless network. The specified position is entered via the input/output interface means and the result of the network coverage calculation is output via said input/output interface means.

The advantages achieved by this decision support apparatus correspond to those achieved by the decision support method described above.

According to an advantageous development of the invention, the decision support apparatus may further comprise a result editing means which is configured to edit the result of the network coverage calculation such that the edited result indicates whether there is a sufficient network coverage at said specified position or not. The result editing means is used in order to improve the clarity of the calculated result of the network coverage at said inputted position.

Another advantageous development can be achieved if said input/output interface means is configured to receive a street address and an installation height of an associated antenna as specified position. Thus, the determination of a network coverage at a street address is straight forward.

In still a further advantageous development of the invention, said decision support apparatus further comprises a network coverage updating buffer means which is configured to buffer the street address and the antenna installation height as well as the associated network coverage calculated by the calculating means based on the inputted street address and the antenna installation height. Said buffer means is further arranged to forward the street address and the installation height of the antenna as well as the associated calculated network coverage to the dynamic network management database via the input/output interface means. Thus the position data, namely the street address and the antenna installation height is adapted such that these data can be stored together with the calculated network coverage in an external network coverage database. Such a collection of user street address can be used for future planning as well as marketing purposes.

BRIEF DESCRIPTION OF THE DRAWINGS

In the following, the present invention will be described in greater detail on the basis of preferred embodiments with reference to the accompanying drawings, in which.

DESCRIPTION OF THE PREFERRED EMBODIMENT

Figure 1:
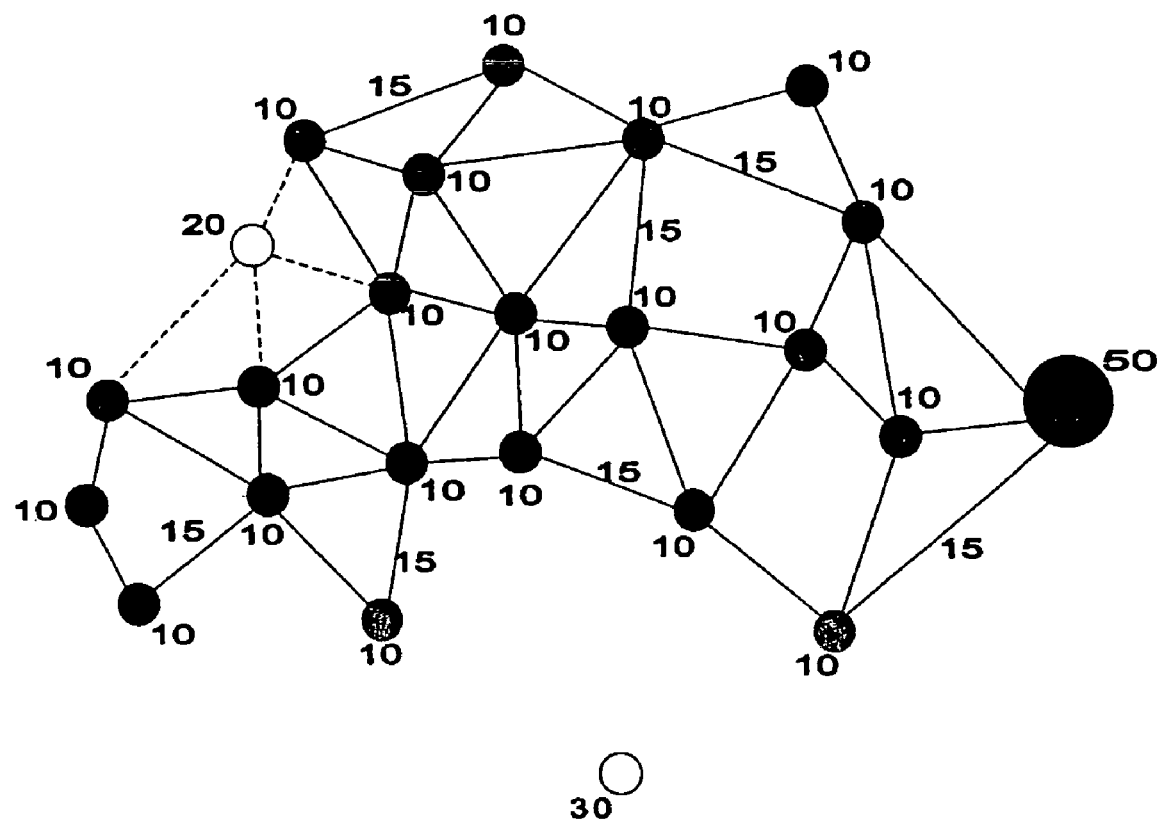
FIG. 1 shows a schematic representation of the nodes in a wireless network.

FIG. 1 shows a schematic representation of the wireless network with a plurality of network nodes 10. Each network node 10 is connected to neighbouring network nodes 10 via a multipoint-to-multipoint line-of-sight connection 15 by which the network nodes 10 communicate with each other. The wireless network comprise a Point-of-Presence POP 50 by which the wireless network is connected to the Internet or any other network. Into this wireless network with its existing network nodes 10 additional nodes 20, 30 are to be added.

Figure 2:
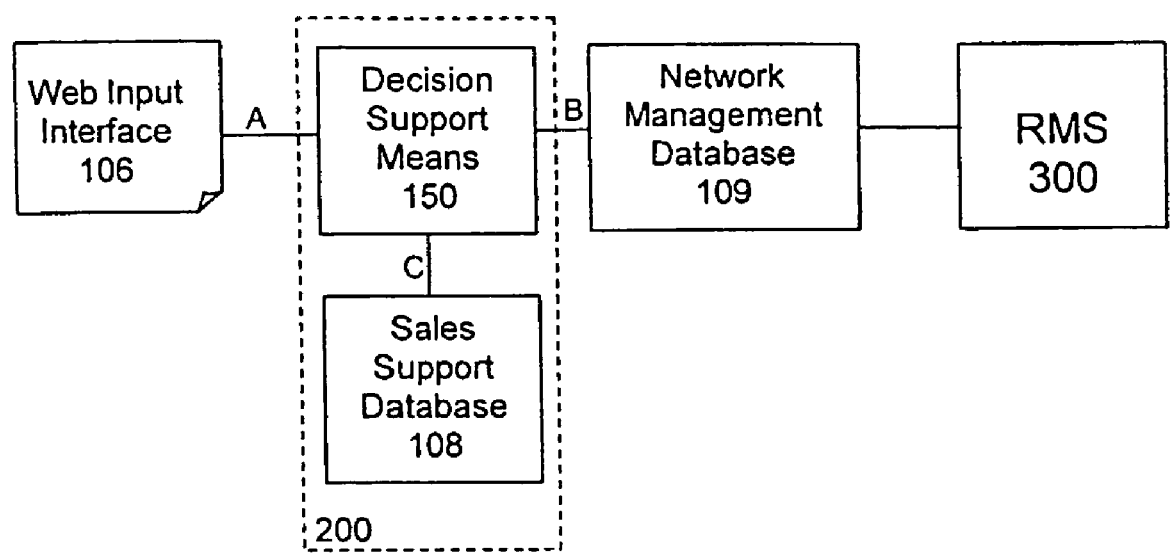
FIG. 2 shows a schematic block diagram of a wireless network management system.

In FIG. 2, a wireless network management system which is used for managing the network system of FIG. 1 is shown. A Router Management System RMS 300 is connected to a network management database 109, which is furthermore connected to a Sales Support System SSS 200, e.g an RMS Service viewer or the like. The SSS 200 is connected to web input interface 106 via the Internet or any other network. The SSS 200 comprises a decision support means 150 and the sales support database 108 connected to said decision support means 150. The SSS 200 is used among others as a direct customer interface for the direct communication with users and end-clients.

Figure 4:
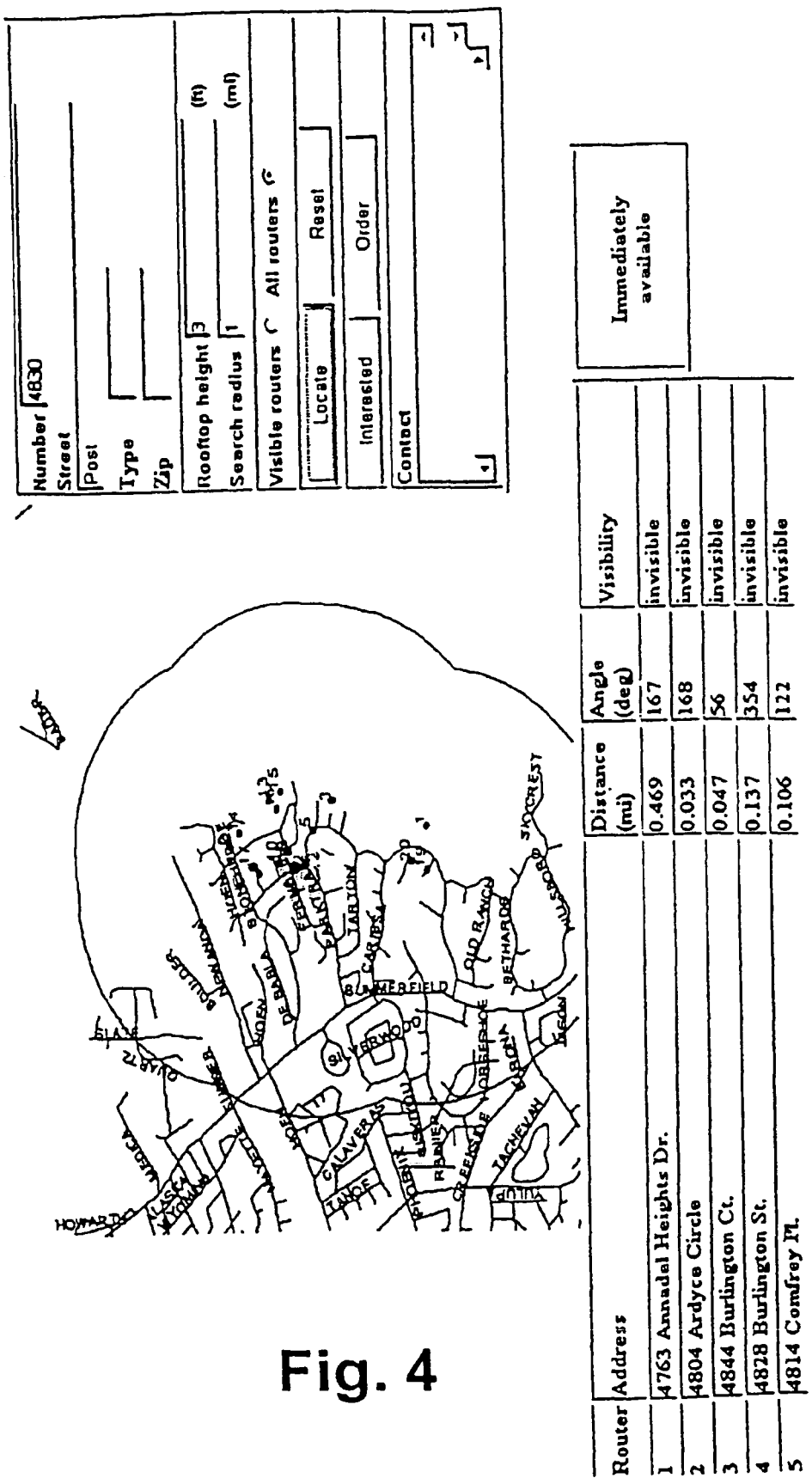
FIG. 4 shows an example of a web user interface.

An example of an implementation of a web input interface 106 is shown in FIG. 4. The user or the end-client can enter a street address where he wants to implement a new network node 20, 30. In addition to the street address the user can enter the height of the roof, i.e. the installation height of the antenna, where the antenna of the network node 10, e.g. a wireless router or another network element, can be arranged. Furthermore the search radius around the entered street address can also be inputted. The street address along with the height of the rooftop, i.e. the antenna installation height, is forwarded to the SSS 200 via the Internet. The decision support means 150 in the SSS 200 receives the street address and the antenna installation height and calculates the network coverage at this street address and this antenna installation height based on information stored in the network management database. This information includes information about the nearest existing wireless routers representing a network node 10. The result of this calculation is outputted via the Internet to the web input interface 106 and displayed using a traffic light fashion. The decision support means 150 forwards the street address, the roof height, i.e. antenna installation height, as well as a calculated network coverage to a sales support database 108, where this information is stored. Said information can be used for the future planning and extension of the wireless network as well as for marketing purposes.

Figure 3:
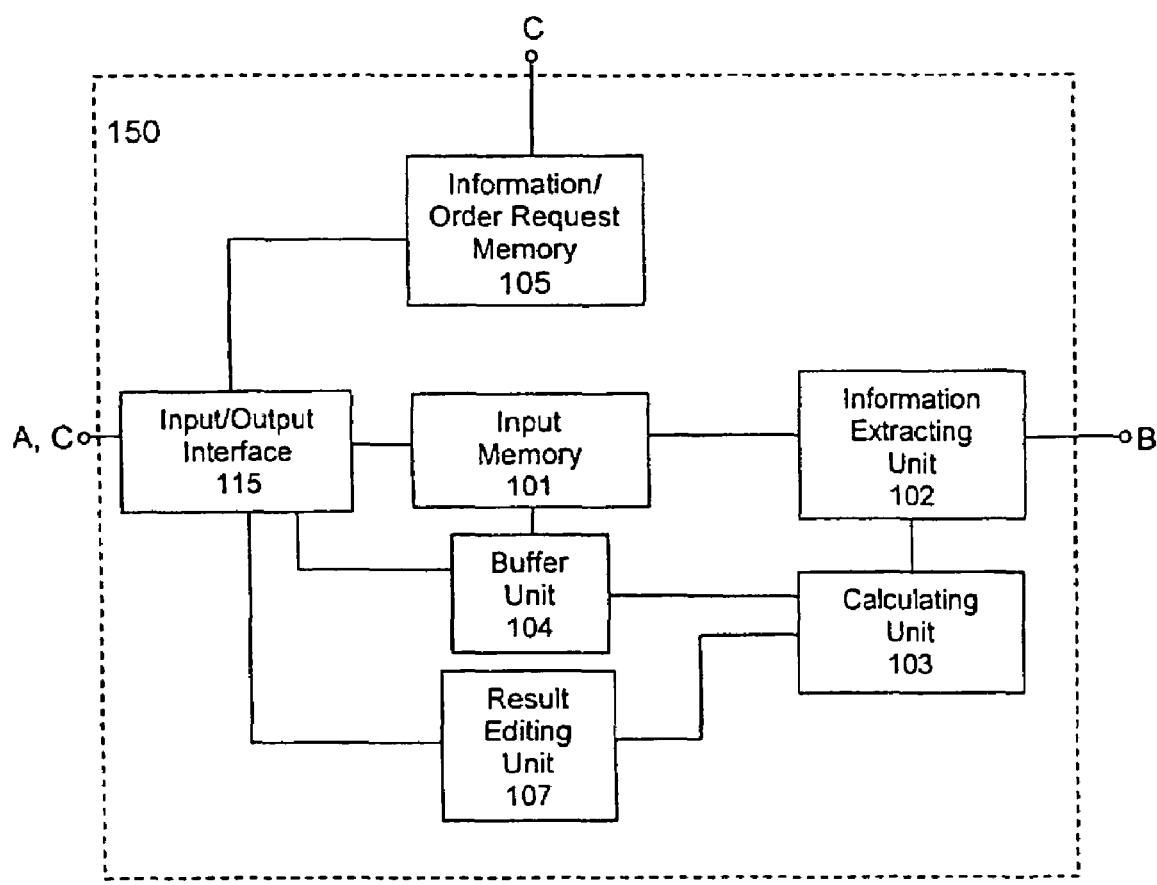
FIG. 3 shows a block diagram of a decision support means for determining a network coverage at a specified position.

FIG. 3 shows a detailed block diagram of the decision support means 150. The decision support means 150 comprises an information extracting unit 102, which is connected to a calculating unit 103 and an input memory 101. The calculating unit 103 is further connected to a buffer unit 104 and a result editing unit 107. The result editing unit 107 is further connected to an input/output interface 106. The buffer unit 104 is connected to the input/output interface 106, the input memory 101 and the calculating unit 103. The input/output interface 106 is connected to an information/order request memory 105.

The input/output interface 106 receives the street address as well as the antenna installation height through the input A via the Internet from the web user interface 106. These data are forwarded to the input memory 101 where they are stored and again forwarded to the information extracting unit 102. The information extracting unit 102 sends an request for information regarding the entered street address and antenna installation height to the network management database 109.

The information retrieved from the network management database 109 may consist for example of the following parts:
a) Line-of-sight to existing wireless routers within a high link speed coverage area
b) Line-of-sight to existing wireless routers within a low link speed coverage area
c) Line-of-sight to planned routers
d) Planned coverage areas, i.e. detailed location of wireless routers which are missing for the time being but where network coverage is to be built
e) Line-of-sight sensitivity to antenna installation height (this information can be used to compensate for errors in map material like missing trees), tolerance in antenna location and estimated quality of the link
f) Likely antenna radiation directions as deduced from other links in the area (e.g. to compensate for antennas located on one side of the building)
g) Availability of other technologies to connect the user (e.g. to create a fixed line connection if for some reason the wireless router connection against the calculated predictions cannot be created)
h) The capacity of the existing Air Hoods. An airhead is a central aggregation router in a wireless routers network that connects subscriber routers in the neighbourhood mesh network to the high-speed uplink or directly to the Internet access point. An Airhood is a cluster of subscriber routers in a neighbourhood. The Airhood is controlled by an air operating system (AirOS). The connections from the subscriber routers in an Airhood to the Internet access point are organised via a single or multiple airheads.

In the calculating unit 103 a prediction of the network coverage at the entered street address with the entered rooftop height, i.e. antenna installation height, is calculated. The calculation unit 103 calculates pair wise line-of-sights from the users street address to other routers within the coverage area. Deciding if a potential customer can be connected to the wireless router network is not trivial. The decision depends from a number of issues: line-of-sight to existing routers, operator's future expansion plans on the customers area, the accuracy of the data (users address, map material). The result of said calculation is forwarded to the result editing unit 107. The calculation parameters may be adapted from the operator of the network management system.

In the result editing unit 107 a result from the network coverage prediction calculation is edited such that the result of the network coverage prediction can be displayed in a simple fashion using the traffic light symbology. The aim of using the result editing unit 107 is to edit the result such that an end-client can determine straight forward whether he can expect a network coverage at the entered street address or not. Accordingly the output of the result editing unit can be: Red e.g. represents no visible neighbour routers at the moment in the requested address; the network is under development; the client is recommended to give the contact information and to use an interested-button and the operator will contact the client for the time schedule. Yellow: e.g. one of two routers are visible and at the required location or the location is in the planned coverage area. Confirmation of the service availability is requested by operator's technical personnel. The client should give the contact information. Green e.g. three or more neighbour routers are visible point the server the service is immediately available in. Contact and the order can be signed immediately.

The result from the network coverage prediction calculation is assigned to one of said 3 possibilities. The determined possibility, i.e. the determined network coverage is forwarded to the input/output interface 115 and via the Internet to the web input interface 106, where the result is displayed e.g. in a traffic light fashion.

The result of the network coverage prediction calculation by the calculating unit 103 is also forwarded to the buffer unit 104, which also receives from the input memory 101 the street address and antenna installation height associated to the calculated network coverage. The buffer unit 104 forwards the inputted street address and the antenna installation height together with the calculated network coverage for said position to the input/output interface 115 which in terms forwards this information to the sales supported database 108. As described above the collection of street addresses in combination with their calculated network coverage as stored in the sales support database 108 can be used for future planning expansion of the wireless network as well as for management purposes.

Additionally to the network coverage traffic light display more information like a map showing the customer location, existing wireless routers and/or a list of the wireless routers can be integrated into the web input interface 106. Detailed maps of the network coverage area may be stored in the network management database 109 and may be retrieved on request.

The web input interface 106 as shown in FIG. 4 also gives the user the opportunity to order a wireless router to be implemented at the inputted address when the network coverage is immediately or later available. This request for a connection to the wireless network is forwarded via the Internet to the decision support means 150, where this request is received by the input/output interface 115. In the input/output interface 115 the incoming signal is determined as a request signal. Accordingly this request signal is forwarded to the information/order request memory 105, where the request is buffered and again forwarded to the sales support database 108.

The user may also request more detailed information via the web input interface 106. Such an information request signal is forwarded to the sales support database 108 in a similar way as described for the order request above.

The input memory 101 can alternatively be integrated into the input/output interface 115.

Figure 5:
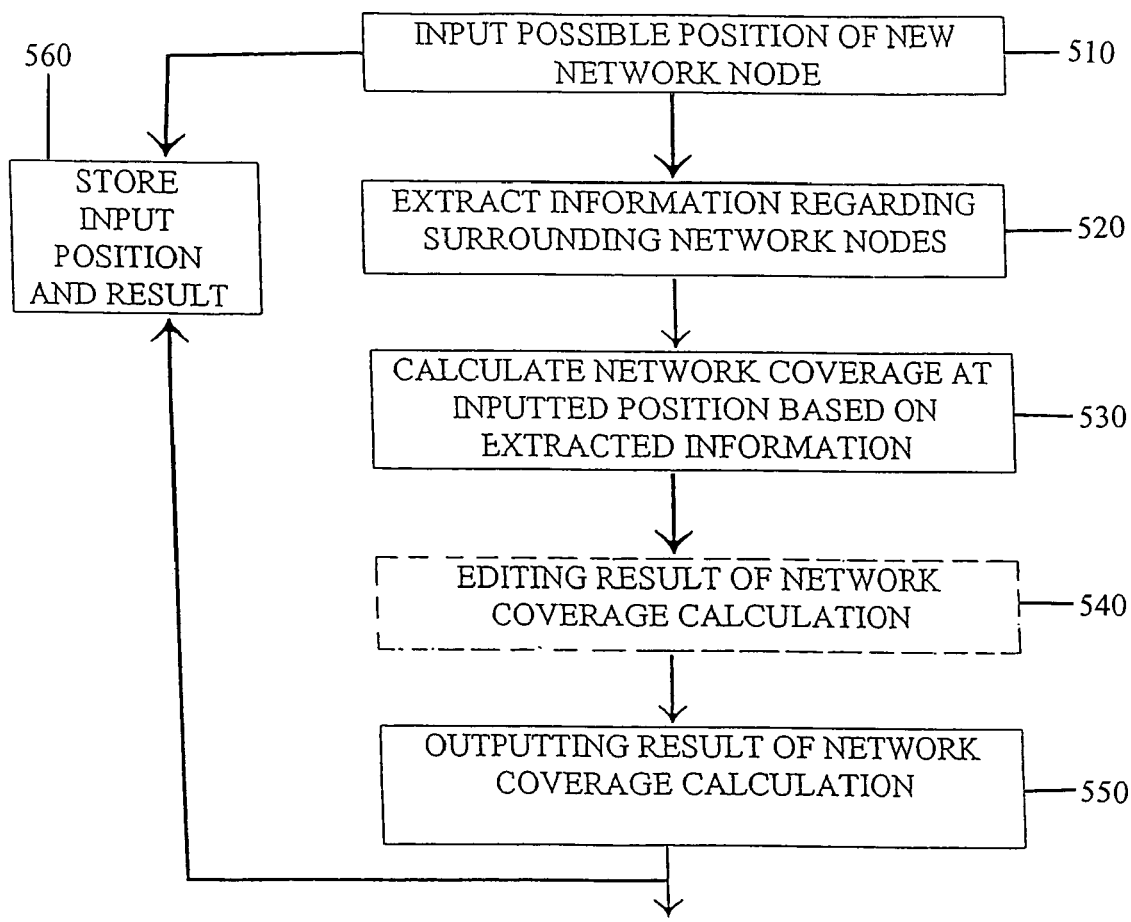
FIG. 5 shows a flowchart of a decision support method.

FIG. 5 shows a flowchart of a decision support method for determining whether a new network node can be added to a wireless network at a specified position, which new network node is used for managing the network system of FIG. 1. Each possible position of the new network node is input (510) and put into a storage for storing input position and result (560). Then, information regarding surrounding network nodes is extracted (520) and the extracted information regarding surrounding network nodes is used to calculate network coverage at inputted position (530). The result of the network coverage calculation is edited (540). The edited result of network coverage calculation is output (550), and the output is also provided to the storage for storing input position and result (560).

It should be noted that the present invention is not restricted to an SSS.

Implementations of the invention in other systems are also possible, where a decision regarding the incorporation of new network nodes is required.

The invention claimed is:

1. A decision support method for determining whether a new node can be added to a wireless network at a specified position, wherein said wireless network comprises a network management system with a dynamic network management database regularly updating the current status of the network nodes in said wireless network, said method comprising the steps of:
  inputting a possible position of said new network node;
  extracting information regarding existing network nodes in the surroundings of said inputted position from said dynamic network management database, wherein said information comprise dynamic position data and/or dynamic transmitting/receiving characteristics data of existing network nodes;
  calculating a network coverage at said inputted position based on said extracted information regarding existing network nodes; and
  outputting the result of the calculated network coverage at said inputted position.

2. The method according to claim 1, further comprising the step of editing the result of the network coverage calculation such that said result indicates network coverage or no network coverage at said specified position.

3. The method according to claim 1, wherein a web user interface is used for inputting the possible position of said new network node and outputting said result of the calculated network coverage at said inputted position.

4. The method according to claim 3, wherein the inputting of a possible position of said new network node is carried out by inputting the street address of the possible position and the antenna installation eight of said network node in to the web user interface.

5. The method according to claim 1, further comprising the step of:
  storing the entered position and the result of the calculated network coverage in a dynamic network coverage database.

6. The method according to claim 1, wherein said new network node is configured as a wireless router.

7. A decision support apparatus for determining whether a new node can be added to a wireless network at a specified position, wherein said wireless network comprise a network management system with a dynamic network management database regularly updating the current status of the network nodes in said wireless network, wherein said decision support means comprises:
  information extracting means for extracting information regarding existing network nodes in the surroundings of said specified position of said new network node from said dynamic network management database, wherein said information comprise dynamic position data and/or dynamic transmitting/receiving characteristics data of existing network nodes;

calculating means for calculating a network coverage at said inputted position based on said extracted information regarding existing network nodes; and input/output interface means for enabling communication with the wireless network, wherein the specified position is entered and the result of the network coverage calculation is output via said input/output interface means.

8. An apparatus according to claim 7, further comprising a result editing means for editing the result of the network coverage calculation, wherein the result editing means is arranged to edit said result such that said result indicates network coverage or not network coverage at said specified position.

9. An apparatus according to claim 8, wherein the input/output interface means is arranged to receive a street address and an antenna installation height as the specified position.

10. An apparatus according to claim 9, further comprising: network coverage updating buffer means for buffering the street address and the antenna installation height and the associated network coverage calculated by the calculating means, wherein said buffer means is arranged to forward the street address and the antenna installation height as well as the associated calculated network coverage to the dynamic network management database via the input/output interface means.

* * * * *